(12) United States Patent
Prater et al.

(10) Patent No.: US 6,342,992 B1
(45) Date of Patent: Jan. 29, 2002

(54) HARD DISK DRIVE ACTUATOR PIVOT WITH INBOARD PADS AND ENHANCED PIVOT SLEEVE THICKNESS FOR IMPROVED SERVO STABILITY

(75) Inventors: Walter Lloyd Prater; Eric Martin Albertson, both of San Jose; Ambrish Misra, Milpitas; Hatem Radwan Radwan, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,377

(22) Filed: Aug. 13, 1999

(51) Int. Cl.[7] .................................................. G11B 5/55
(52) U.S. Cl. ..................................... 360/265.6; 384/296
(58) Field of Search ........................... 360/265.6, 265.2; 384/296, 295, 276, 569, 275

(56) References Cited

U.S. PATENT DOCUMENTS

| | | | |
|---|---|---|---|
| 5,315,465 A | 5/1994 | Blanks | |
| 5,446,608 A | 8/1995 | Sanada | |
| 5,473,489 A | 12/1995 | Sanada | |
| 5,675,456 A | 10/1997 | Myers | |

*Primary Examiner*—Craig A. Renner
(74) *Attorney, Agent, or Firm*—Robert B. Martin; Bracewell & Patterson L.L.P.

(57) ABSTRACT

A hard disk drive actuator pivot cartridge has a sleeve, a coaxial pivot shaft, and a pair of bearings therebetween. The bearings are located near the axial ends of the shaft. The sleeve has a wall thickness that is substantially greater than those of prior art sleeves. The sleeve also has a pair of annular pads that are located axially inward of the bearings. The cartridge mounts inside an actuator comb such that only the pads contact the bore of the comb. The axial location of the pads and the greater wall thickness of the sleeve significantly decrease the bending experienced by the cartridge when it is installed in the comb, and thereby increase the servo stability and performance of the disk drive.

22 Claims, 4 Drawing Sheets

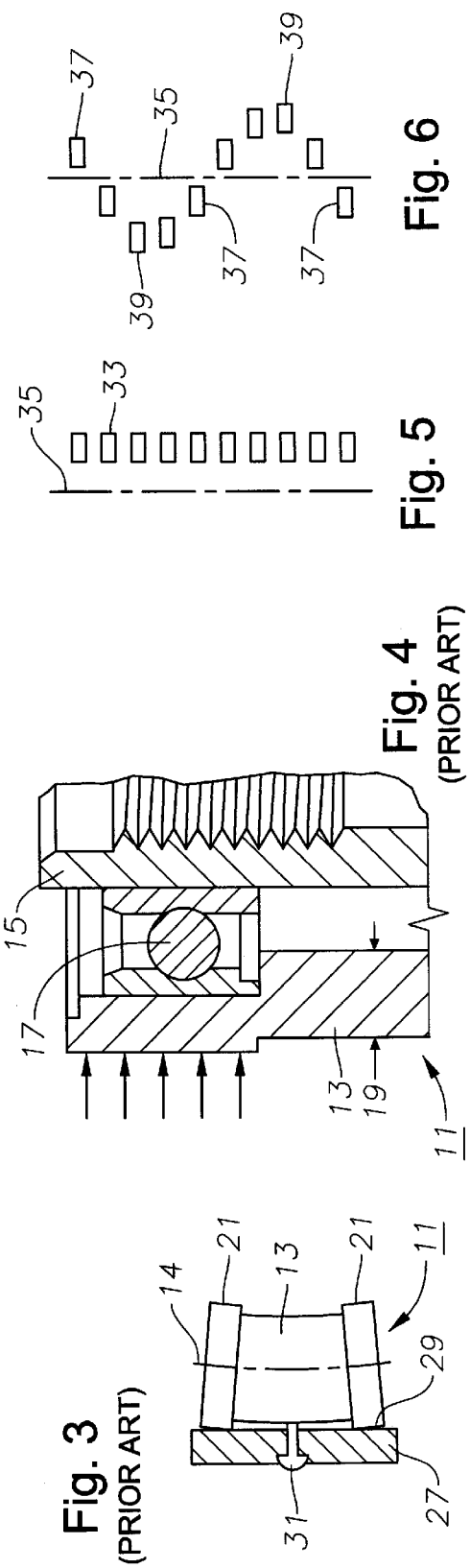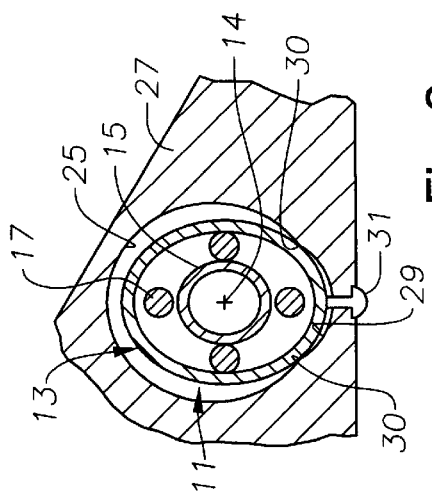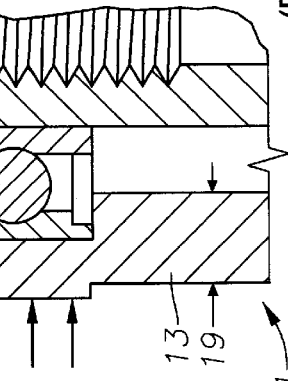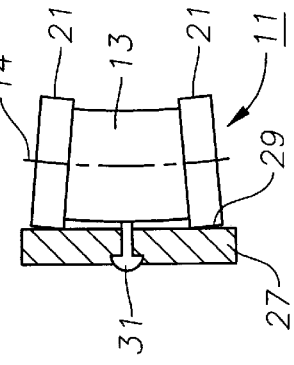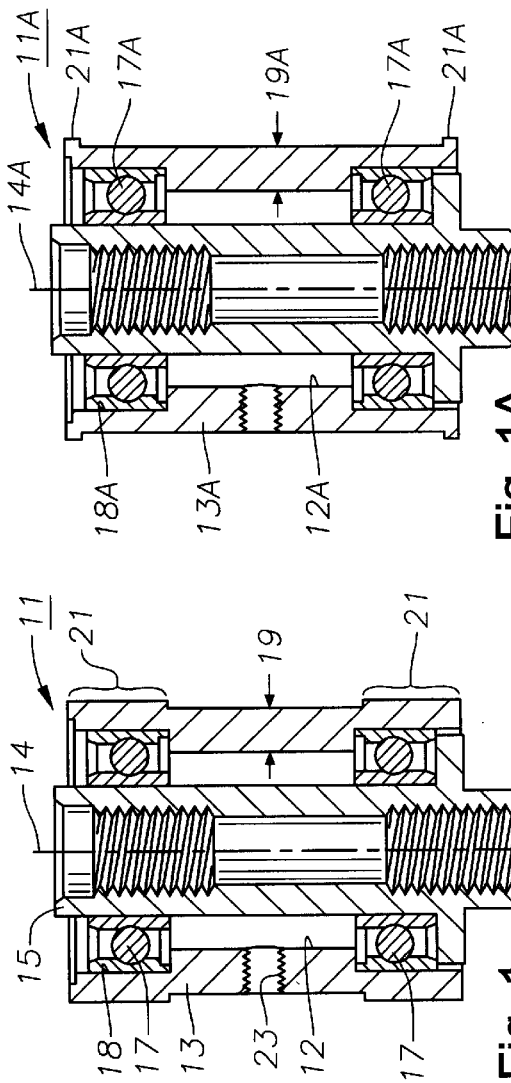

HARD DISK DRIVE ACTUATOR PIVOT WITH INBOARD PADS AND ENHANCED PIVOT SLEEVE THICKNESS FOR IMPROVED SERVO STABILITY

BACKGROUND OF THE INVENTION

1. Technical Field

This invention relates in general to hard disk drives and in particular to enhanced mechanical features on hard disk drive actuator pivot cartridges including contact pads that are axially inboard of the pivot bearings and a pivot sleeve with an enhanced wall thickness for improving the servo stability of the disk drive.

2. Background Art

Referring to FIG. 1, a conventional, prior art actuator pivot cartridge 11 for a hard disk drive has an outer, cylindrical housing or sleeve 13 with a bore 12 and axis 14, an inner pivot shaft 15, and a pair of bearings 17. Shaft 15 rotates or pivots relative to sleeve and bearings 17 are mounted in counterbores 18 at the axial ends of sleeve 13. Counterbores 18 have a larger diameter than that of bore 12. Note that counterbores 18 only support the outer races of bearings 17 and that bore 12 is located radially outward of the center of the balls of bearings 17. Sleeve 13 has a threaded radial mounting hole 23 that is centrally located between its axial ends.

Sleeve 13 also has a wall thickness 19 of approximately 2.0 mm. Thickness 19 is adequately sized to generally handle most loads exerted on cartridge 11. However, thickness 19 is less than twice as thick as the wall thickness of the sleeve at counterbores 18. Wall thickness 19 also provides ample clearance (about 1.0 mm) between bore 12 and the outer surface of shaft 15. The external profile or cross-section of sleeve 13 is altered slightly at its axial ends with integrally formed, annular bosses or pads 21 that extend around its circumference. Pads 21 are provided as closely toleranced, highly repeatable contact surfaces for cartridges 11 as will be described below. If cartridge 11 had a smooth cylindrical exterior along its entire axial length, the tolerances of the contacting surfaces would be much more difficult to control. Pads 21 are substantially axially aligned with their respective bearings 17 and counterbores 18.

A second prior art example is illustrated in FIG. 1A as cartridge 11A. This example is more fully described in U.S. Pat. No. 5,446,608. Like cartridge 11, cartridge 11A has a sleeve 13A with a bore 12A and axis 14A, a shaft, and a pair of bearings 17A in counterbores 18A. Sleeve 13A has a conventional wall thickness 19A of approximately 2.0 mm. Cartridge 11A also has a pair of narrow pads 21A that are located axially outward or "outboard" of bearings 17A.

As shown in FIGS. 2 and 3, cartridge 11 or 11A (only cartridge 11 is shown for simplicity) mounts in the cylindrical bore 25 of an actuator comb 27. A scallop-shaped, undercut portion 29 extends axially along the inner surface of bore 25 for providing two axial "lines" of contact 30 for cartridge 11. Cartridge 11 is secured from movement relative to comb 27 with a single screw 31 that extends through a radial hole in comb 27 into the undercut portion 29. The outer surfaces of pads 21 make contact with lines 30 in bore 25 (FIG. 4). Due to the axial end positions of pads 21 and the limited wall thickness 19 of sleeve 13, cartridge 11 tends to bow slightly along axis 14 and distorts radially to form an ellipse (shown exaggerated for ease of understanding). Even a slight axial or radial distortion in cartridge 11 will decrease the servo stability, decrease servo performance, and increase the torsional resistance of bearings 17 due to the changes in bearing stiffness.

A disk drive with poor servo stability will generate an excess of hard errors. Instability can be characterized by measuring the plant transfer function of the drive and examining the relevant dynamic modes. Modes which are not at the proper gain or frequency are the sources of the instability. For example, at the "butterfly" mode (FIG. 5), the heads 33 of the drive oscillate over the midpoint 35 of the unit in a uniform pattern. In the S-mode (FIG. 6), the top, middle and bottom heads 37 oscillate about the midpoint 35 by a small amount, while the remaining heads 39 oscillate with greater magnitude.

The S-mode can be filtered out using a servo notch if it remains at a consistent frequency and gain. However, if the mode has a large gain or spread, or it is located at a frequency outside the servo notch zone, the mode will remain unfiltered and cause servo instability. These modes are very sensitive to the stiffness of the actuator mechanical system components, including the pivot cartridge, actuator comb, coil, head gimbal assembly (HGA), and their interfaces. Thus, an improved mechanical system with greater component stiffness is desirable to increase servo stability and performance of the disk drive.

SUMMARY OF THE INVENTION

A hard disk drive actuator pivot cartridge has a sleeve, a coaxial pivot shaft, and a pair of bearings therebetween. The bearings are located near the axial ends of the shaft. The sleeve has a wall thickness that is substantially greater than those of prior art sleeves. The sleeve also has a pair of annular pads that are located axially inward of the bearings. The cartridge mounts inside an actuator comb such that only the pads contact the bore of the comb. The axial location of the pads and the greater wall thickness of the sleeve significantly decrease the bending experienced by the cartridge when it is installed in the comb, and thereby increase the servo stability and performance of the disk drive.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 1 is a sectional side view of a prior art actuator pivot cartridge.

FIG. 1A is a sectional side view of a prior art actuator pivot cartridge having an axially outboard pad.

FIG. 2 is a schematic sectional top view of the prior art cartridge of FIG. 1 shown installed in an actuator comb.

FIG. 3 is a schematic side view of the prior art cartridge and comb assembly of FIG. 2.

FIG. 4 is an enlarged partial sectional side view of the prior art cartridge of FIG. 1.

FIG. 5 is a schematic drawing of disk drive heads operating at their butterfly mode shape.

FIG. 6 is a schematic drawing of the disk drive heads of FIG. 5 operating at their S-mode shape.

BEST MODE FOR CARRYING OUT THE INVENTION

Figure 7:
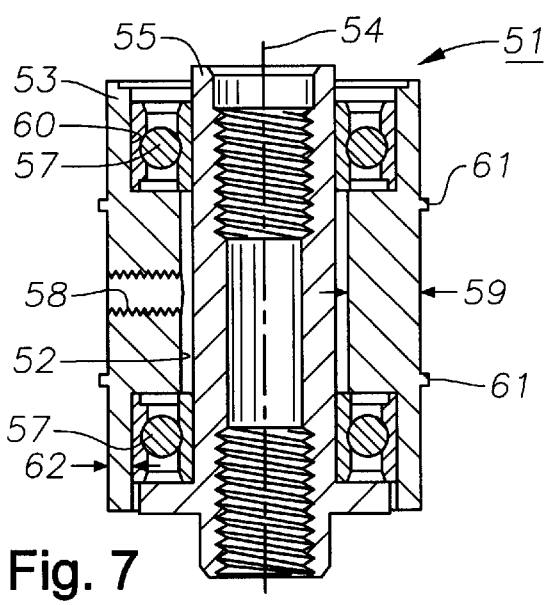
FIG. 7 is a sectional side view of an actuator pivot cartridge constructed in accordance with the invention.
Figure 8:
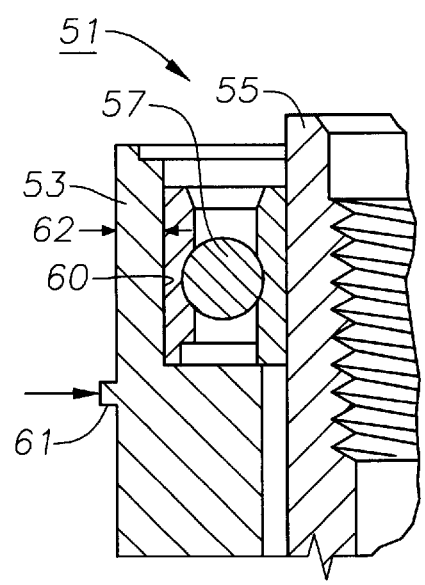
FIG. 8 is an enlarged partial sectional side view of the cartridge of FIG. 7.

Referring to FIGS. 7 and 8, a hard disk drive actuator pivot cartridge 51 of the present invention is shown. Cartridge 51 has an outer, cylindrical housing or sleeve 53 with an axis 54, a bore 52, an inner pivot shaft 55, and a pair of bearings 57. Shaft 55 rotates or pivots relative to sleeve 53, and bearings 57 are mounted in counterbores 60 at the axial ends of sleeve 53. Sleeve 53 has a radial wall thickness 62 at counterbores 60. Counterbores 60 have a larger diameter than that of bore 52 and extend radially inward all the way to and substantially align with the inner races of bearings 57. Bore 52 is located radially inward of the center of the balls of bearings 57. Sleeve 53 has a threaded radial mounting hole 58 that is centrally located between its axial ends.

Sleeve 53 has two features that readily distinguish it from prior art sleeves in terms of both profile and performance. First, sleeve 53 has a wall thickness 59 at bore 52 that is substantially greater than that found in the prior art (at least 2.5 mm). In the embodiment shown, thickness 59 is in the range of 2.5 to 2.9 mm, and is preferably about 2.78 mm, or about 34% thicker than a typical cartridge sleeve. Thickness 59 is more than twice as thick as wall thickness 62 at counterbores 60. Thickness 59 gives sleeve 53 greater stiffness to handle the loads imposed on cartridge 51. Bore 52 provides shaft 55 with an adequate clearance of about 0.2 mm for rotation therein.

The second improvement in sleeve 53 is its outer profile. Sleeve 53 has a cylindrical outer surface with a pair of narrow, annular bosses or pads 61 that are integrally formed with sleeve 53. Pads 61 provide closely toleranced, highly repeatable contact surfaces for cartridges 51. If cartridge 51 did not have pads 61, the tolerances of the long, axial contacting surfaces would be much more difficult to control. In an alternate embodiment, pads 61 could comprise a single larger pad that is located axially inboard of both bearings 57.

Unlike the outboard pads of prior art cartridges, pads 61 are spaced axially inward or "inboard" of bearings 57 and counterbores 60. Pads 61 extend radially from the outer surface of sleeve 53 and have a "height" in the range of 0.005 to 1.0 mm. Pads 61 have a narrow axial dimension or "width" in the range of 0.5 to 2.0 mm to reduce contact area and ensure high contact pressure at the pivot-comb interface, thereby improving joint consistency. In the embodiment shown, pads 61 have a height of about 0.023 mm and a width of about 1.0 mm.

Cartridge 51 mounts inside an actuator comb in the same manner as previously described for cartridge 11. However, as shown in FIG. 8, cartridge 51 will only contact the comb at pads 61 (see arrow), rather than across the axial ends of the sleeve as in the prior art. This new design keeps the screw attachment distortion from being transferred directly into bearings 57. The location of pads 61 and greater wall thickness 59 significantly decrease the bowing, bending, and radial distortion experienced by cartridge 51 (see FIG. 3). Thus, these two mechanical enhancements significantly increase the servo stability and performance of the disk drive.

Cartridges 11, 11A and 51 were dynamically tested at the disk drive level. One dozen disk drives were built with cartridges 11, tested, and then rebuilt and retested with cartridges 51. In addition, a different set of disk drives were built and tested with cartridges 51, and then rebuilt and retested with cartridges 11A having outboard pads. The disk drive design goals for the experiment were to increase the butterfly mode frequency, increase the butterfly mode gain, decrease the butterfly mode tilt, and decrease the S-mode gain, while reducing the standard deviations for each. A final goal was to reduce the S-mode failure rate. Note that when the drives were equipped with the outboard pad cartridges 11A, 20% of the drives failed because they were out of specification for the S-mode gain (see table below). In both experiments, the inboard pad, thick sleeve pivot increased the butterfly mode frequency and gain, reduced the butterfly mode tilt, and reduced the S-mode gain or its standard deviation (see tables below).

Experiment 1

| Pivot Type | Drive Sample Size | Butterfly Frequency, Hz (mean/std dev) | Butterfly Gain, dB (mean/std dev) | Butterfly Tilt dB/mm (mean/std dev) | S-mode Gain dB (mean/std dev) |
|---|---|---|---|---|---|
| Conventional cartridge 11 | 12 | 3562.81/ 146.1 | 21.71/3.58 | 0.16/0.14 | 9.04/3.84 |
| Inboard pad, thick sleeve cartridge 51 | 12 | 3620.75/ 79.66 | 25.17/2.62 | 0.12/0.07 | 6.75/2.83 |
| Difference | — | (+)57.94/ (−)66.45 | (+)3.46/ (−)0.96 | (−)0.04/ (−)0.07 | (−)2.29/ (−)1.01 |

| | | | | Butterfly | | Drives |
|---|---|---|---|---|---|---|
| | | Butterfly | Butterfly | Tilt | S-mode | failing |
| | Drive | Frequency, Hz | Gain, dB | dB/mm | Gain, dB | spec |
| Pivot Type | Sample Size | (mean/std dev) | (mean/std dev) | (mean/std dev) | (mean/std dev) | $\geq 17$ dB |
| Outboard pad cartridge 11A | 10 | 3511.88/ 94.09 | 21.16/ 3.25 | 0.11/0.11 | 10.40/ 4.81 | 20% |
| Inboard pad, thick sleeve cartridge 51 | 14 | 3653.95/ 84.30 | 24.22/ 2.69 | 0.09/0.05 | 11.39/ 2.90 | 0% |
| Difference | — | (+)142.07/ (−)9.79 | (+)2.96/ (−)0.56 | (−)0.02/ (−)0.06 | (+)0.99/ (−)1.91 | 20% |

Experiment 2

Figure 9:
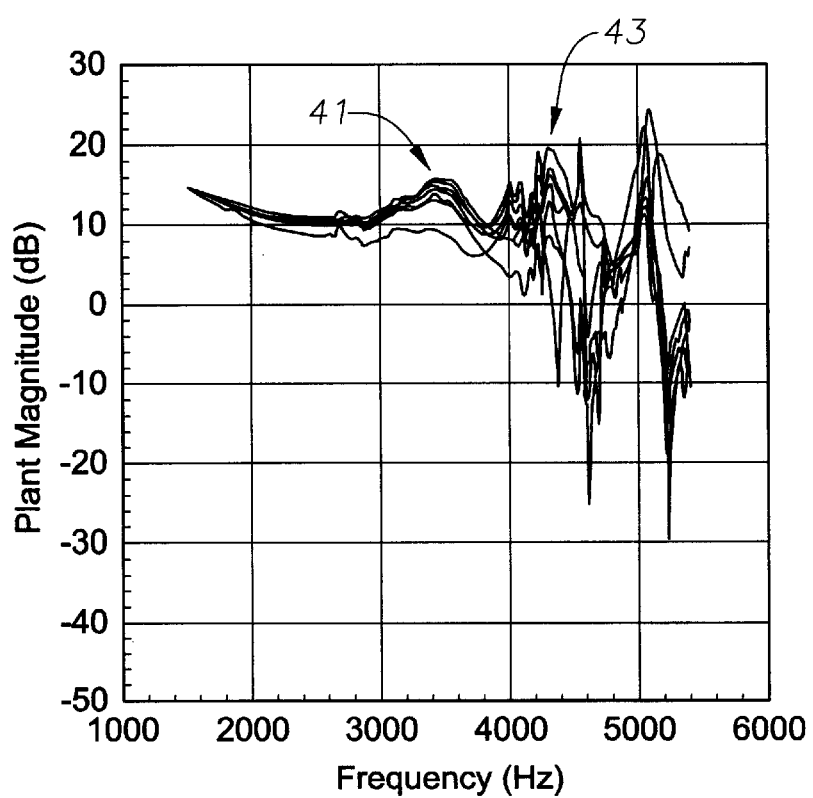
FIG. 9 is a plot of the plant transfer function of a hard disk drive having the prior art cartridge of FIG. 1.

FIG. 9 depicts the transfer function analysis performance of a disk drive with a prior art cartridge 11. Cartridge 11 gives the drive a low-gain, tilted butterfly mode 41 (approximately 400 Hz lower than the desired frequency of about 3800 Hz), and a high gain S-mode 43. These values are symptoms of a dynamically unstable servo system. Low stiffness within bearings 17 of cartridge 11 and at the pivot-comb interfaces were found to be the cause of the servo instability. The stiffness variations were due to pivot sleeve distortions which translate into bearing raceway distortions. The uneven and inconsistent contact between cartridge 11 and comb 27 is caused by side attachment screw 31 (FIGS. 1 and 2) and undercut portion 29 of bore 25.

Figure 10:
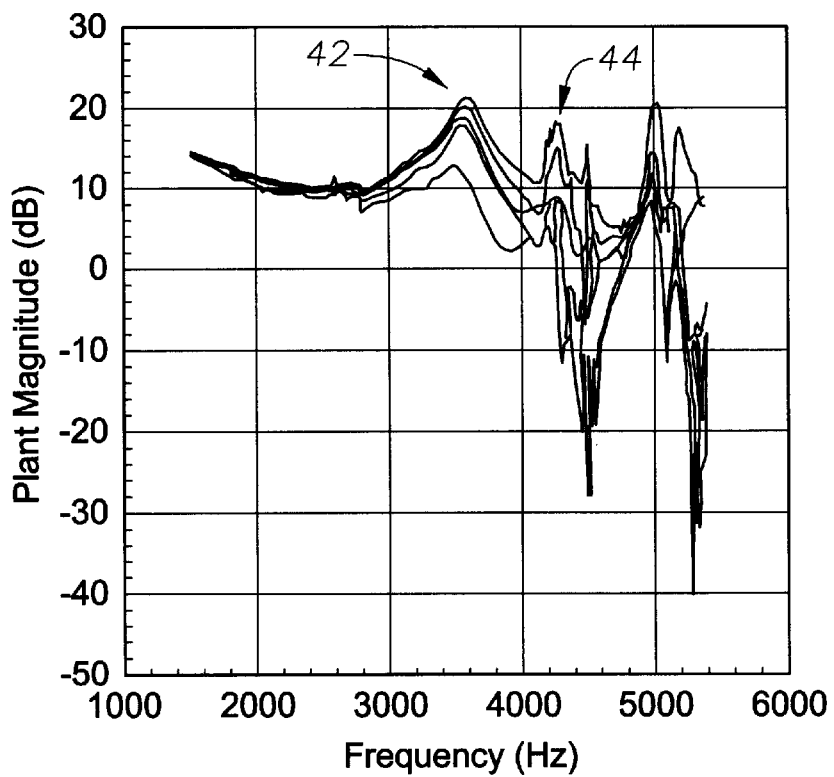
FIG. 10 is a plot of the plant transfer function of a hard disk drive having the prior art cartridge of FIG. 1A with outboard pads.

As shown in FIG. 10, even when the disk drive is rebuilt a cartridge 11A having outboard pads, the servo stability and performance of the drive (see butterfly mode 42 and S-mode 44) is substantially unchanged over the standard cartridge 11.

Figure 11:
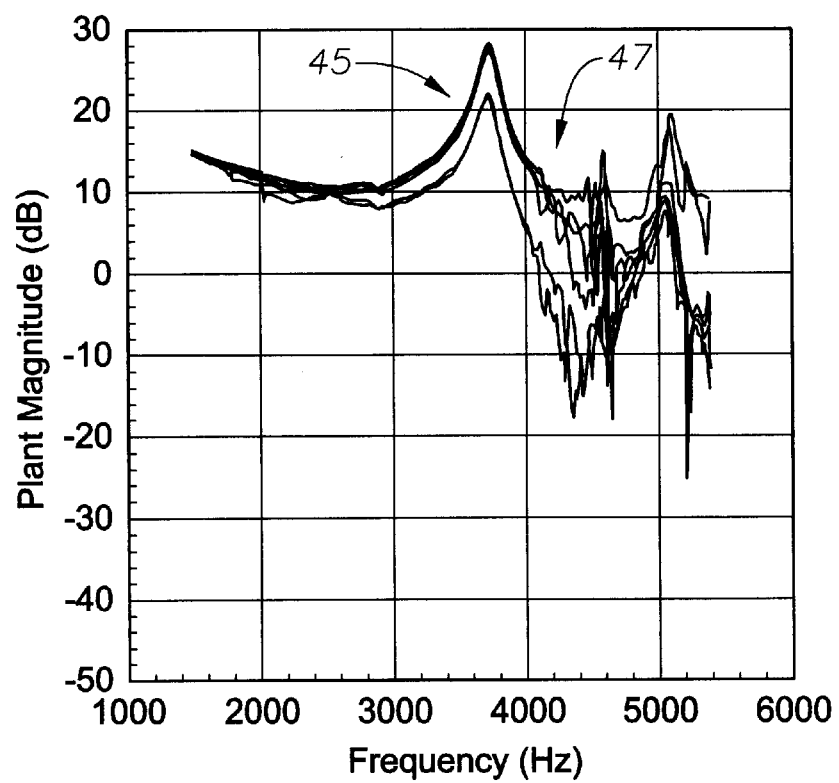
FIG. 11 is a plot of the plant transfer function of a hard disk drive having the improved cartridge of FIG. 7 with greater sleeve wall thickness and inboard pads.

In contrast, a disk drive built with cartridge 51 of the present invention has good dynamic servo stability (FIG. 11). Cartridge 51 gives the drive a high gain, no-tilt butterfly mode 45 at the proper frequency, and a nearly non-existent low gain S-mode 47. As these modes are very sensitive to the stiffness of the actuator components, the enhanced structural features of cartridge 51 lead to better dynamic servo stability and drive performance.

Figure 12:
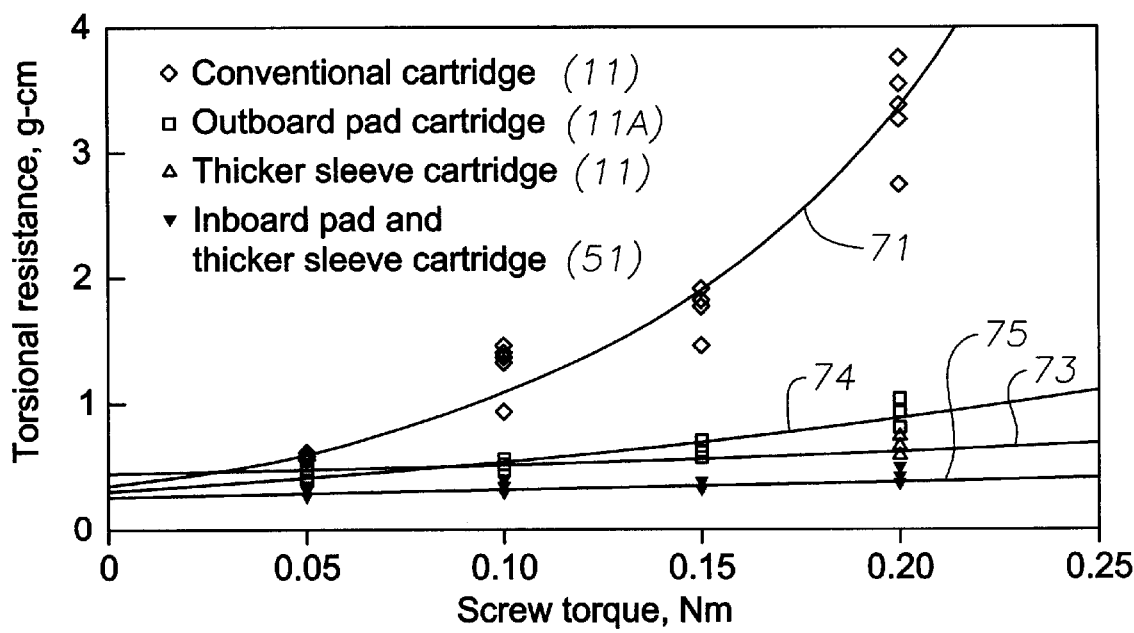
FIG. 12 is a plot of the average torsional resistances of the disk drives tested in FIGS. 9–11 over a range of attachment screw torques to an actuator comb.
Figure 13:
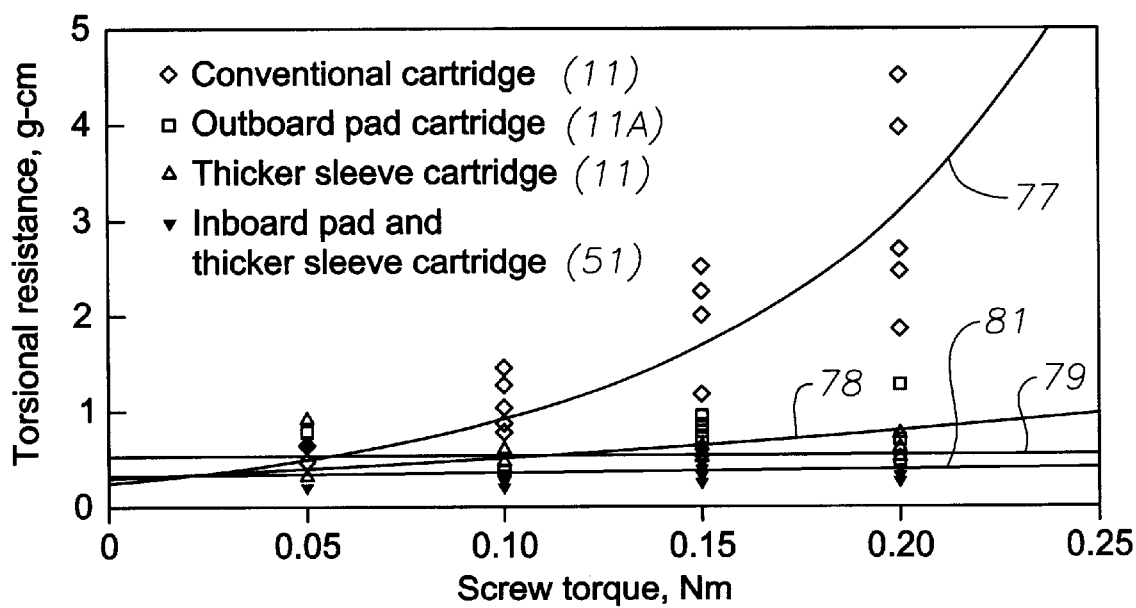
FIG. 13 is a plot of the peak-to-peak variation of torsional resistances of the disk drives tested in FIGS. 9–11 over a range of attachment screw torques to an actuator comb.

The improved torque performance of cartridge 51 over cartridges 11 and 11A is illustrated in FIGS. 12 and 13. FIG. 12 depicts the torque applied to the side attachment screw 31 on the horizontal axis, versus the average torsional resistance of the cartridges on the vertical axis, with low mean and standard deviation values being the direction of goodness. Plot 71 delineates the performance of cartridge 11 and shows that a linear increase in screw torque results in an exponential increase in its average torsional resistance. As discussed above, this dramatic increase in resistance can lead to servo instability and poor performance. Plot 74 depicts the performance of an outboard pad cartridge 11A and shows an increase in pivot average torque with increasing attachment screw torque. Plot 73 depicts the performance of a modified cartridge 11 having the same pads 21 as a normal cartridge 11, but with a sleeve wall thickness that is equal to that of cartridge 51. The thick-walled cartridge 11 has only a marginal increase in average torsional resistance over the same range of screw torques. Finally, plot 75 shows the torque performance of cartridge 51. The average torsional resistance of cartridge 51 has no appreciable increase, even at the highest screw torque levels.

FIG. 13 is similar to FIG. 12 and depicts the torque applied to the side attachment screw 31 on the horizontal axis, versus the peak-to-peak (highest to lowest) torsional resistance of the cartridges on the vertical axis. Plots 77, 78, 79, 81 represent the torque performance of cartridge 11, outboard pad cartridge 11A, thick-walled cartridge 11, and cartridge 51, respectively. These plots closely track those of FIG. 12. Cartridge 51 has the best performance by maintaining a consistent low torsional resistance regardless of screw torque.

Precise values of torque testing are shown in the following two tables which represent two different disk drive applications for each cartridge type:

| Pivot Type | Sample Size | Avg Torque g-cm (mean) | Avg Torque g-cm (std dev) | Pk–Pk Torque g-cm (mean) | Pk–Pk Torque g-cm (std dev) |
|---|---|---|---|---|---|
| Prior art Cartridge 11 | 51 | 0.641 | 0.269 | 0.091 | 0.268 |
| Outboard pad Cartridge 11A | 10 | 0.574 | 0.111 | 0.085 | 0.035 |
| Inboard pad and thick sleeve Cartridge 51 Group 1 | 25 | 0.532 | 0.125 | 0.028 | 0.015 |
| Inboard pad and thick sleeve Cartridge 51 Group 2 | 12 | 0.663 | 0.067 | 0.043 | 0.025 |

Application 1

Although there was little improvement in the average torque mean values, cartridge 51 showed improvements in standard deviation of up to 70% over the outboard pad cartridge 11A, and up to a 400% improvement over the conventional cartridge 11. In addition, the peak-to-peak mean values of cartridge 51 were two to three times better than either cartridge 11 or 11A. Note that the outboard pad cartridge 11A did not show improvement over the conventional cartridge 11. Finally, the peak-to-peak standard deviations of cartridge 51 were 40 to 130% better than the outboard pad cartridge 11A, and ten to eighteen times better than prior art cartridge 11.

A second disk drive application was tested with these same types of cartridges. The values for this test are shown below:

Application 2

| Pivot Type | Sample Size | Avg Torque g-cm (mean) | Avg Torque g-cm (std dev) | Pk–Pk Torque g-cm (mean) | Pk–Pk Torque g-cm (std dev) |
|---|---|---|---|---|---|
| Conventional cartridge 11 | 50 | 0.67 | 0.15 | 0.04 | 0.03 |
| Outboard pad cartridge 11A | 10 | 0.46 | 0.04 | 0.04 | 0.02 |
| Inboard pad and thick sleeve cartridge 51 | 10 | 0.31 | 0.04 | 0.03 | 0.01 |

This disk drive application showed similar improvements for cartridge 51. In the average torque mean values, cartridge 51 was 32% lower than the outboard pad cartridge 11A, and less than half that of cartridge 11. Cartridge 51 also showed improvements in standard deviation of almost one-third that of cartridge 11. In addition, the peak-to-peak mean values of cartridge 51 were 25% better than either version of cartridge 11. Once again, the outboard pad cartridge 11A showed no improvement over cartridge 11 in this category. Finally, the peak-to-peak standard deviations of cartridge 51 were half of those for the outboard pad cartridge 11A, and one-third of those for the prior art cartridge 11.

The invention has several advantages. Actuator pivot cartridges constructed with the combination of a thick-walled sleeve and an inboard location for the support pads provides the most significant improvement over prior art cartridges. These mechanical enhancements greatly improve the servo stability, performance, and reliability of the disk drives in which they are installed.

While the invention has been shown or described in only some of its forms, it should be apparent to those skilled in the art that it is not so limited, but is susceptible to various changes without departing from the scope of the invention.

We claim:

1. An actuator pivot cartridge for a hard disk drive, comprising:
   a cylindrical housing having an axis, an outer surface, a central bore that defines a first wall thickness, two axial ends, and an axial counterbore on each axial end that defines a second wall thickness;
   a shaft coaxially mounted within the bore of the housing;
   a bearing mounted in each of the counterbores between the housing and the shaft adjacent to the axial ends of the housing; and
   at least one pad integrally formed with the housing on the outer surface and extending radially therefrom, wherein said at least one pad is located axially inboard of the bearings and the counterbores, said at least one pad defining a radially outermost contact surface whereby radial mounting forces are directly transmitted.

2. The actuator pivot cartridge of claim 1 wherein the first wall thickness of the housing is in the range of 2.5 to 2.9 mm.

3. The actuator pivot cartridge of claim 1 wherein said at least one pad is a circumferential pad.

4. The actuator pivot cartridge of claim 1 wherein said at least one pad has a radial dimension in the range of 0.005 to 1.0 mm.

5. The actuator pivot cartridge of claim 1 wherein the first wall thickness is at least twice as thick as the second wall thickness.

6. The actuator pivot cartridge of claim 1 wherein said at least one pad has an axial dimension in the range of 0.5 to 2.0 mm.

7. The actuator pivot cartridge of claim 1 wherein the housing has a clearance of about 0.2 mm between the central bore and the shaft.

8. The actuator pivot cartridge of claim 1 wherein the central bore substantially radially aligns with inner races of the bearings.

9. The actuator pivot cartridge of claim 1 wherein said at least one pad is a pair of pads that are both located axially inboard of the bearings and counterbores.

10. An actuator pivot cartridge for a hard disk drive, comprising:
    a cylindrical housing having an axis, an outer surface, a central bore that defines a first wall thickness, two axial ends, an axial counterbore on each axial end that defines a second wall thickness, and a threaded hole located between the counterbores and extending radially through the first wall thickness of the housing from the central bore to the outer surface;
    a shaft coaxially mounted within the central bore of the housing;
    a bearing mounted in each of the counterbores between the housing and the shaft adjacent to the axial ends of the housing;
    a pair of spaced annular pads integrally formed with the housing on the outer surface, wherein each of the pads is located axially inboard of the bearings and the counterbores, and is adapted to transmit radial mounting forces; and wherein
    the first wall thickness of the housing is at least 2.5 mm.

11. The actuator pivot cartridge of claim 10 wherein each of the pads has a radial dimension in the range of 0.005 to 1.0 mm.

12. The actuator pivot cartridge of claim 10 wherein the first wall thickness is at least twice as thick as the second wall thickness.

13. The actuator pivot cartridge of claim 10 wherein each of the pads has an axial dimension in the range of 0.5 to 2.0 mm.

14. The actuator pivot cartridge of claim 10 wherein the housing has a clearance of about 0.2 mm between the central bore and the shaft.

15. The actuator pivot cartridge of claim 10 wherein the central bore substantially radially aligns with inner races of the bearings.

16. An actuator for a hard disk drive, comprising:

an actuator comb having a comb bore with a radial hole;

an actuator pivot cartridge mounted in the comb bore of the actuator comb; wherein the cartridge comprises:

a cylindrical housing having an axis, an outer surface, a central bore that defines a first wall thickness, two axial ends, an axial counterbore on each axial end that defines a second wall thickness, and a threaded hole located between the counterbores and extending radially through the first wall thickness of the housing from the central bore to the outer surface;

a screw inserted through the radial hole of the comb and the threaded hole of the housing for fastening the housing to the comb;

a shaft coaxially mounted within the central bore of the housing;

a bearing mounted in each of the counterbores between the housing and the shaft adjacent to the axial ends of the housing; and a pair of spaced annular pads integrally formed with the housing on the outer surface, wherein each of the pads is located axially inboard of the bearings and the counterbores, and is adapted to transmit radial mounting forces.

17. The actuator of claim 16 wherein the first wall thickness of the housing is in the range of 2.5 to 2.9 mm.

18. The actuator of claim 16 wherein each of the pads has a radial dimension in the range of 0.005 to 1.0 mm.

19. The actuator of claim 16 wherein the first wall thickness is at least twice as thick as the second wall thickness.

20. The actuator of claim 16 wherein each of the pads has an axial dimension in the range of 0.5 to 2.0 mm.

21. The actuator of claim 16 wherein the housing has a clearance of about 0.2 mm between the central bore and the shaft.

22. The actuator of claim 16 wherein the central bore substantially radially aligns with inner races of the bearings.

* * * * *